(12) United States Patent
Molenaar

(10) Patent No.: US 7,134,981 B2
(45) Date of Patent: Nov. 14, 2006

(54) STEERING QUICKENER

(75) Inventor: Kelly J. Molenaar, Kalamazoo, MI (US)

(73) Assignee: New Concept Products, Inc., Schoolcraft, MI (US)

( * ) Notice: Subject to any disclaimer, the term of this patent is extended or adjusted under 35 U.S.C. 154(b) by 157 days.

(21) Appl. No.: 11/003,672

(22) Filed: Dec. 3, 2004

(65) Prior Publication Data

US 2006/0122022 A1    Jun. 8, 2006

(51) Int. Cl.
*F16H 57/08* (2006.01)

(52) U.S. Cl. .................. 475/336; 74/492; 180/444; 280/93.506

(58) Field of Classification Search ............... 475/159, 475/336, 306, 220, 230; 280/93.506, 779, 280/93.513, 93.51, 93.502; 74/492; 180/444, 180/446
See application file for complete search history.

(56) References Cited

U.S. PATENT DOCUMENTS

| RE17,266 | E | * | 4/1929 | Waseige | 475/159 |
| 1,909,330 | A | * | 5/1933 | Banker | 74/498 |
| 2,468,314 | A | * | 4/1949 | Vogel | 74/494 |
| 2,771,791 | A | * | 11/1956 | Bachman | 475/9 |
| 4,556,116 | A | * | 12/1985 | O'Neil | 180/444 |

FOREIGN PATENT DOCUMENTS

JP    58167257 A    * 10/1983

* cited by examiner

*Primary Examiner*—Charles A. Marmor
*Assistant Examiner*—Justin K. Holmes
(74) *Attorney, Agent, or Firm*—Price, Heneveld, Cooper, DeWitt & Litton, LLP

(57) ABSTRACT

A steering quickener including at least a housing and a cap, an immobile stationary gear, an input shaft, two or more planetary gears, a drive pin, an output gear, thrust washer, an output shaft, at least one roller bearing and at least one O-ring is provided.

16 Claims, 5 Drawing Sheets

STEERING QUICKENER

BACKGROUND OF THE INVENTION

Aftermarket steering quickeners are typically used to improve the response time and overall handling of factory-installed steering systems. These steering quickeners are typically used in certain classes of racing automobiles, which typically do not allow the use of aftermarket steering systems. However, these same classes do allow the use of steering quickeners, which may be installed into an OEM (Original Equipment Manufacture) or factory-installed steering system. When a steering quickener is employed in an automobile, the driver of the automobile can turn the steering wheel a smaller distance, compared to an OEM or factory-installed steering system without a steering quickener, to turn the vehicle the same degree. This is highly desirable in racing automobiles where steering response is critical.

Conventional steering quickeners are typically designed so that an output shaft travels around the inside of a circular toothed gear (see prior art FIG. 1). This design creates much more instability within the steering quickener itself and results in much less torque, and less torque handling ability of the steering quickener.

Conventional steering quickeners are generally comprised of, among other things, a housing containing spur gears. This housing typically also contains grease. The grease contained with conventional steering quickeners acts as a lubricant to the internal components of the steering quickener. However, after a period of use the grease fails to provide adequate lubrication to the internal components within the housing. Once this occurs, there is increased friction, and resistance among the moving internal components, which results in damage to the internal components and decreases the useful life of the steering quickener.

Conventional steering quickeners also typically include one pair of spur gears (see prior art FIG. 1). This means that at any given time there is only one pair of spur gear teeth in contact with one another. This substantially limits the torque carrying capacity for a given gear pitch of these conventional steering quickeners. Additionally, the teeth on the one pair of spur gears is generally flat and not designed to increase the torque carrying capacity, or transfer the torque carrying capacity, evenly throughout the teeth of the gear so there is an evenly dispersed torque carrying load on the planetary gear teeth.

Surprisingly, Applicants have developed an in-line steering quickener that has at least two pairs of planetary gear teeth always in contact with one another. The input gear and the output gear are substantially in-line with one another, which results in a higher torque carrying capacity for a given gear pitch. Additionally, the teeth of the planetary gears are designed to evenly distribute the torque carrying capacity of the steering quickener which allows the use of lighter weight construction materials and less expensive construction materials, while maintaining the same or greater torque carrying capacity.

SUMMARY OF THE INVENTION

One aspect of the present invention includes a vehicle having a frame structure. The vehicle includes at least two wheels rotatably mounted to the frame structure. The vehicle also includes a steering system connected to the frame. The steering system includes a steering quickener. The steering quickener includes a housing connected to a cap and an immobile stationary gear disposed within the housing having a centrally located opening therein. Within the housing and cap is an input shaft having a first end in communication with a power source. The input shaft also has a second end having at least two opposing generally flat surfaces and an opening extending therebetween. At least a portion of the input shaft is disposed within the centrally located opening in the stationary gear and the stationary gear is capable of rotating about a longitudinal axis. Within the housing and cap are also two or more planetary gears. The planetary gears are in communication with the stationary gear and the second end of the input shaft. Each planetary gear includes a centrally located opening therein. Within the housing and cap is also located a drive pin having a first end and a second end. At least a portion of the drive pin is disposed within a centrally located opening in the at least two or more planetary gears and the opening extending between the at least two opposing generally flat surfaces of the second end of the input shaft. Within the housing and cap is also located an output gear in communication with at least a portion of the at least two planetary gears. The output gear has a centrally located opening therein. A thrust washer having a centrally located opening therein, is also disposed within the housing and cap. The thrust washer is in communication with at least a portion of the output gear. Also located within the housing and cap is an output shaft disposed within at least a portion of the centrally located opening of the output gear. When the input shaft moves about its longitudinal axis, the output shaft rotates about its longitudinal axis at about twice the rate of the input shaft.

Another aspect of the present invention includes a steering quickener. A steering quickener including at least a housing connected to a cap, an immobile stationary gear, an input shaft, two or more planetary gears, a drive pin, an output gear, a thrust washer, an output shaft, a roller bearing and an O-ring is provided.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 3:
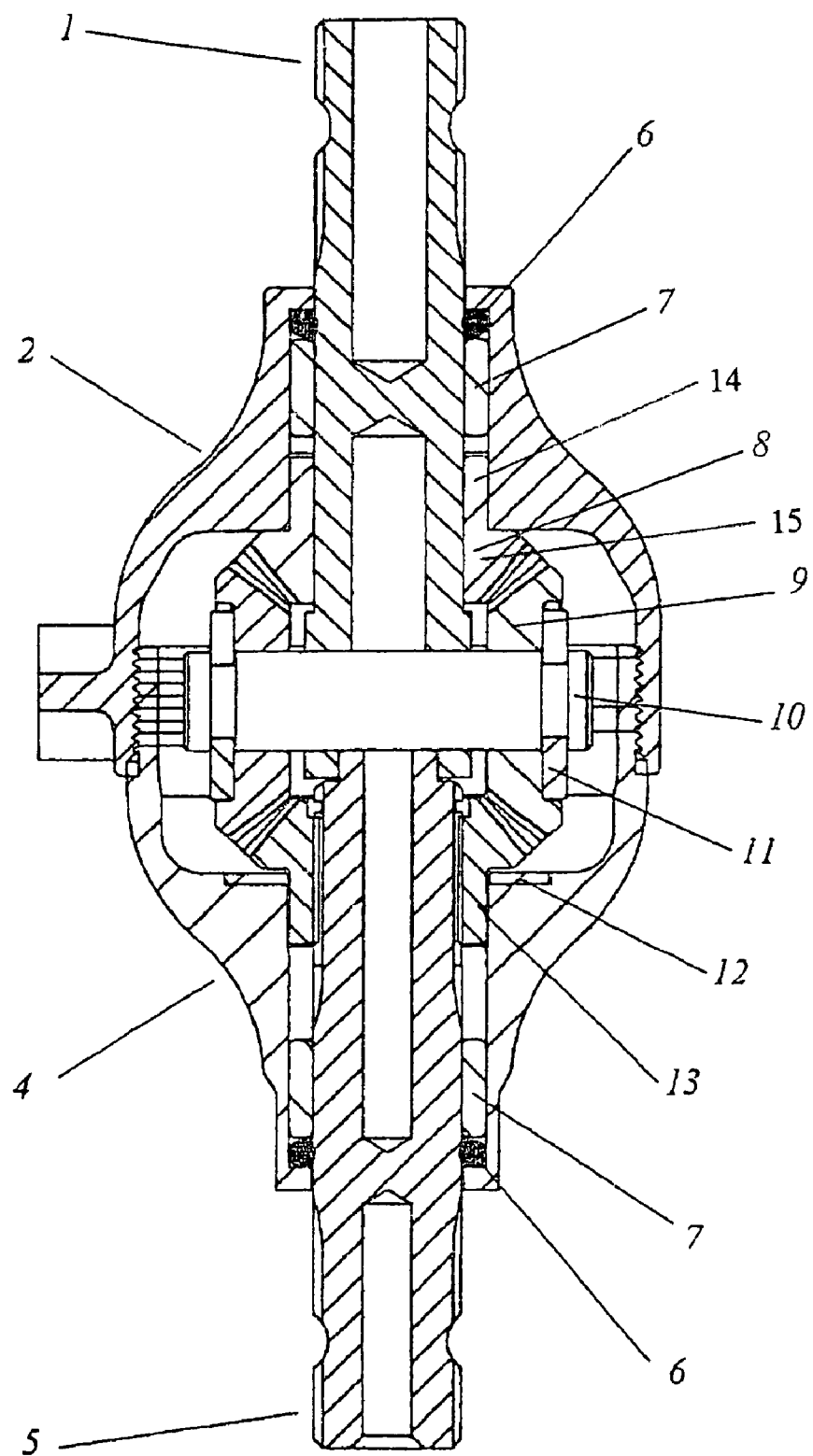
FIG. 3 is a cross section view of the steering quickener according to one aspect of the present invention.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The present invention includes a steering quickener having at least a housing and cap, an immobile stationary gear, an input shaft, two or more planetary gears, a drive pin, an output gear, a thrust washer, an output shaft, at least one roller bearing and at least one O-ring.

Figure 2:
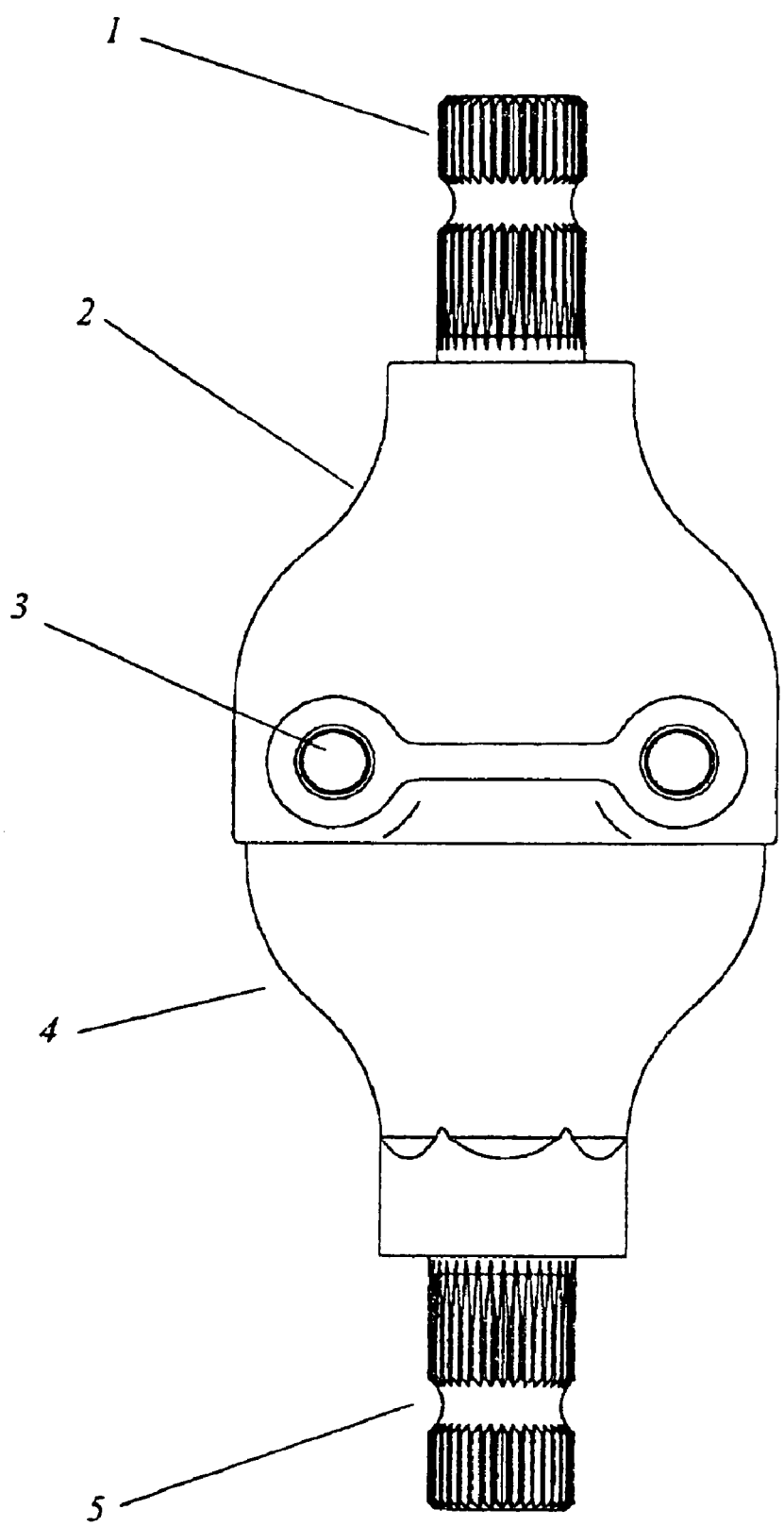
FIG. 2 is a plan view of the steering quickener according to one aspect of the present invention.

Referring to FIG. 2, housing 2 and cap 4 encompass the majority of the components of steering quickener 20, with the exception of a portion of input shaft 1 and output shaft 5 extending from at least one end of the combination of housing and cap 4. Housing 2 and cap 4 may be connected via any type of connection, including, but not limited to, a threaded connection, an adhered connection, a welded connection, a soldered connection, however, a threaded connection is preferred. In a threaded connection, cap 4 is typically smaller in diameter than housing 2 such that cap 4 screws into (i.e., to the inside of housing 2). Housing 2 includes mounting holes 3. Mounting holes 3 may be used to mount steering quickener 20 to a mounting bracket or other connection means within the steering system of a vehicle. Housing 2 in cap 4 may be comprised of any type of material, including, but not limited to, metal, wood, plastic, carbon fiber, KEVLAR®, fiberglass, or any combinations or derivations of any of the above. However, metal is the preferred construction material of housing 2 and cap 4. Housing 2 and cap 4 may be any dimension necessary to encompass the majority of steering quickener 20. Contained within housing 2 and cap 4 is an oil bath, hereinafter referred to as an oil-bath lubrication. This oil lubricates the internal components of the steering quickener of the present invention, which extends the life of the internal components (namely, the planetary gears). Oil is a superior lubricant to grease (as used within conventional steering quickeners) within the steering quickener of the present invention because it is less viscous. Because of this property, the oil coats more of the internal components of the steering quickener and provides better lubrication, resulting in less damage and a longer usage life of the steering quickener. Any amount of oil may be used in the oil-bath lubrication. Also, any type of oil may be used in the oil-bath lubrication.

Referring now to FIG. 3, within housing 2 is stationary gear 8. At least a portion of stationary gear 8 is permanently connected to housing 2. Stationary gear 8 includes base 14 and stationary gear teeth 15. Base 14 is most typically permanently connected to housing 2, such that stationary gear 8 is immobile and/or does not rotate within housing 2. Stationary gear 8 has a centrally located opening therein adapted to receive input shaft 1.

Figure 1:
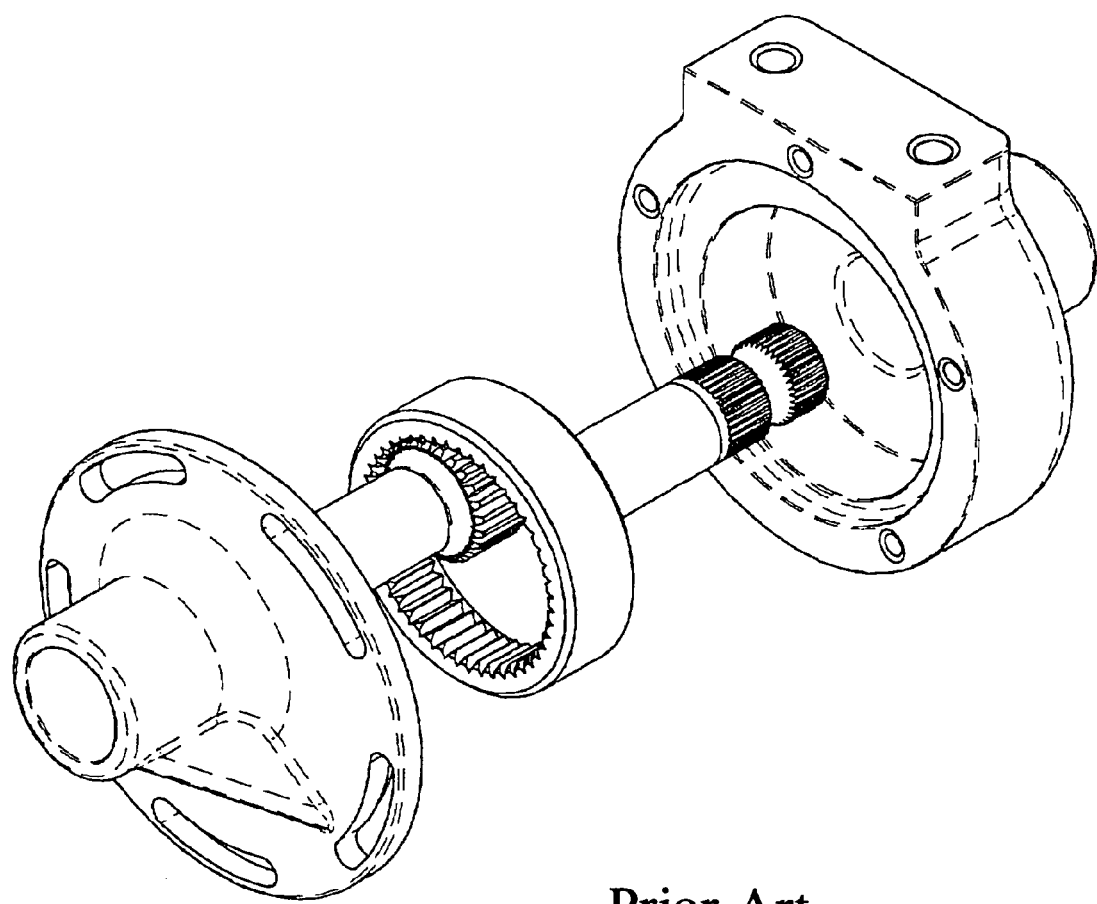
FIG. 1 is a prior art drawing of a conventional steering quickener.

At least a portion of input shaft 1 is disposed within the centrally located opening of stationary gear 8. As can be seen in FIG. 2, at least a portion of input shaft 1 extends beyond housing 2. This portion of input shaft 1 extending beyond housing 2 is typically connected to the steering mechanism (i.e., steering wheel or shaft or rod leading to the steering wheel) of the vehicle to which steering quickener 20 is to be used. Located between this portion of input shaft 1 extending beyond housing 2 as can be seen in FIG. 1 and between the stationary gear teeth 15 as can be seen in FIG. 3, is disposed O-ring 6 and roller bearing 7. O-ring 6 holds the oil within the housing 2 and cap 4. Roller bearing 7 is used to generally hold input shaft 1 within the opening of housing 2. Roller bearing 7 is in contact with input shaft 1 and housing 2. Roller bearing 7 allows input shaft 1 to rotate about a longitudinal axis within the input shaft opening of housing 2 and within the centrally located opening in stationary gear 8.

Figure 4:
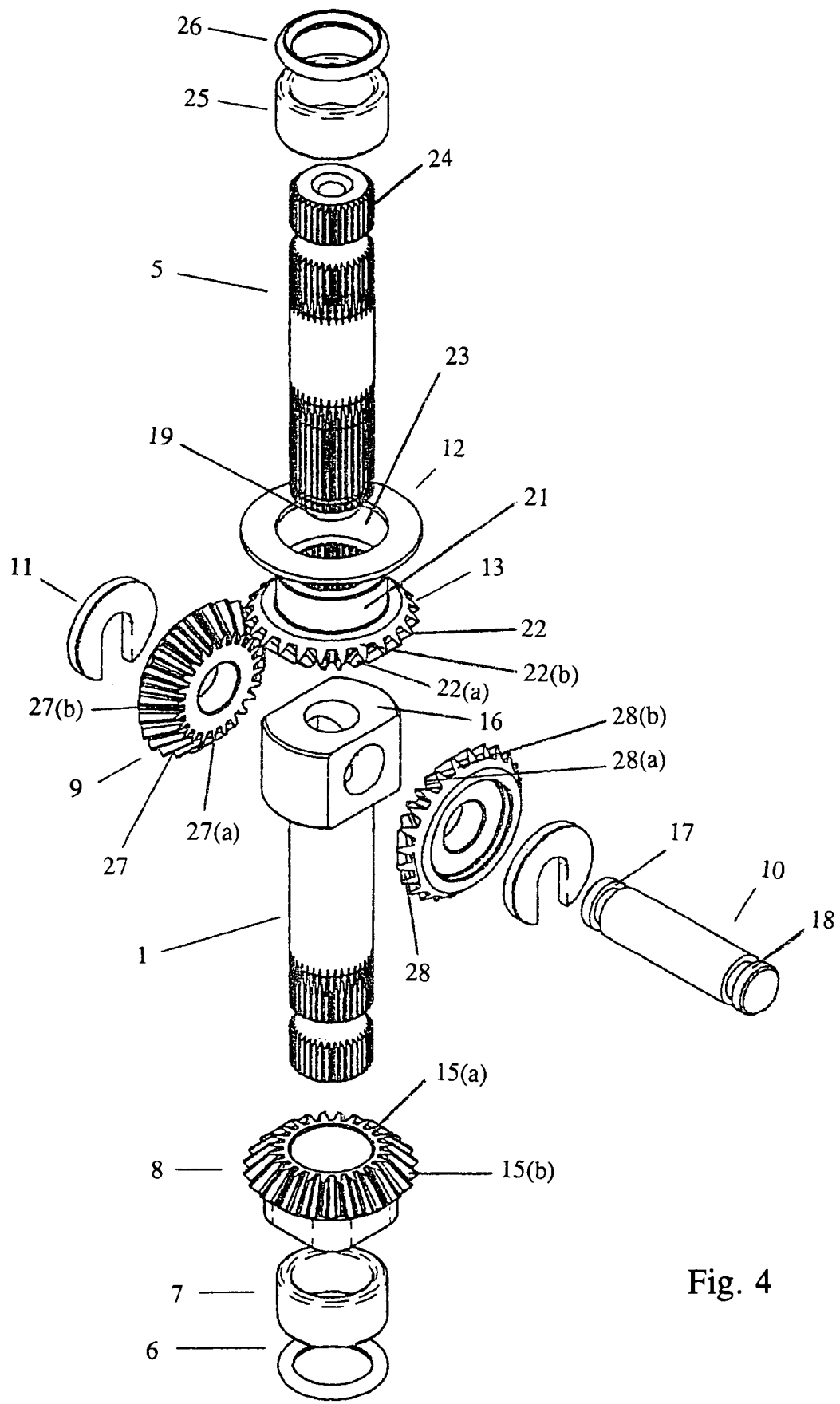
FIG. 4 is an exploded perspective view of the steering quickener according to one aspect of the present invention.
Figure 5:
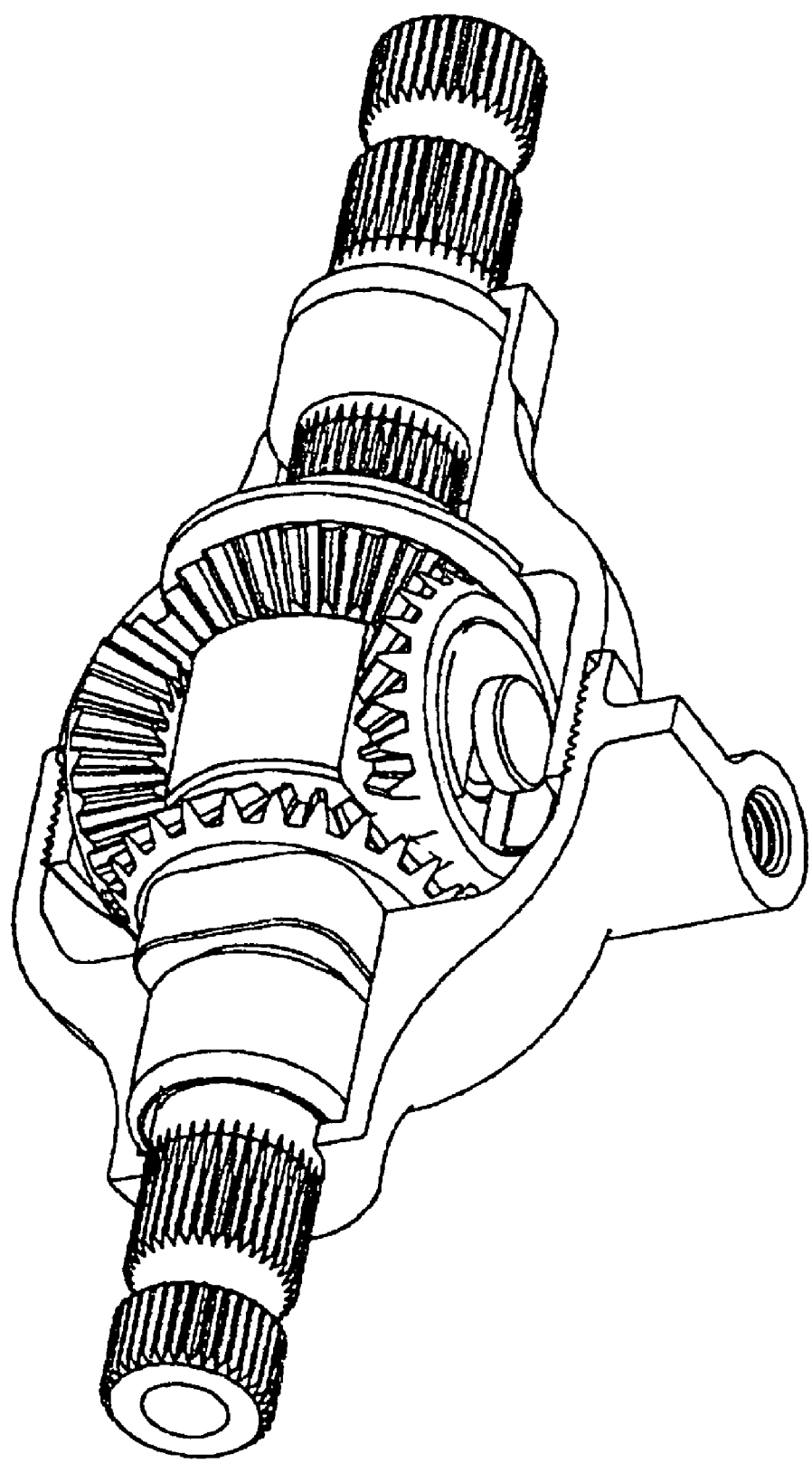
FIG. 5 is a partial perspective view showing one-half of the housing removed of the steering quickener according to one aspect of the present invention.

As can more readily be seen in FIG. 4, input shaft 1 has a connection end 16. Connection end 16 includes at least one or more generally centrally located openings extending through connection end 16, such that this generally centrally located opening is generally perpendicular to input shaft 1 and adapted to receive drive pin 10.

Drive pin 10 includes a first end 17 and a second end 18, each are adapted to receive C-clip retainers 11. As can be seen in FIG. 3, drive pin 10 is disposed within the generally centrally located opening within second connection end 16. Drive pin 10 holds in place one or more planetary gears 9.

Planetary gears 9 contain a centrally located opening therein adapted to receive drive pin 10. Once drive pin 10 is placed within the centrally located opening of planetary gear(s) 9 and within the generally centrally located opening within connection end 16 of input shaft 1, C-clip retainers 11 are placed on first end 17 of drive pin 10 and second end 18 of drive pin 10 to hold the planetary gears on drive pin 10 and within the connection end 16 of input shaft 1.

Connection end 16 of input shaft 1 also includes a centrally located opening therein, which is generally parallel with input shaft 1. This parallel opening in connection end 16 is adapted to receive the first end 19 of output shaft 5.

Located on output shaft 5 is output gear 13. Output gear 13 includes a centrally located opening therein adapted to receive output shaft 5. Output gear 13 includes a base end 21 and a teeth end 22. Base end 21 is adapted to receive thrust washer 12. Thrust washer 12 has an opening centrally located therein adapted to receive output shaft 5. At least a portion of thrust washer 12 is smaller in diameter than base end 21 of output gear 13. This portion that is smaller in diameter than base end 21 of output gear 13 is in communication with base end 21 of output gear 13. Additionally, thrust washer 12 has an inner surface 23 that is in permanent communication with output shaft 5, such that when thrust washer 12 is rotated about the longitudinal axis of output shaft 5, output shaft 5 also rotates about its longitudinal axis.

Output shaft 5 also includes second end 24. As can be seen in FIG. 2, at least a portion of second end 24 of output shaft 5 extends beyond cap 4. Also, as can be seen in FIGS. 2 and 4, output shaft 5 has disposed thereon roller bearing 25 and O-ring 26. Roller bearing 25 and O-ring 26 serve the same purpose as previously discussed roller bearing 7 and O-ring 6.

Referring to FIG. 3, the stationary gear teeth 15 are in contact with both the planetary gear teeth 27 and planetary gear teeth 28. Also, planetary gear teeth 27 and planetary gear teeth 28 are also in contact with output gear teeth 22. As can be seen in FIG. 4, the teeth on each of the aforementioned gears is narrower on its "(a)" side (i.e., 15(a), 27(a), 28(a), and 22(a)) than the teeth are on their "(b)" side (i.e., 15(b), 27(b), 28(b), and 22(b)). This angled tooth configuration, having a narrower "(a)" side and a wider "(b)" side, allows the teeth to transfer the torque carrying capacity from the (a) side throughout the entirety of the tooth to the (b) side. This results in a higher torque carrying capacity of the gears and allows the gears to be constructed to lighter weight materials.

Additionally, because of the in-line design of the present invention and because there are multiple pairs of teeth in contact at all times, the steering quickener of the present invention has an overall higher torque carrying capacity than conventional steering quickeners and is more stable due to the in-line design than conventional steering quickeners.

In use, steering quickener 20 is installed into the steering shaft of a vehicle. Input shaft 1 is positioned and in connection with the steering mechanism (i.e., steering wheel) of the vehicle. Output shaft 5 is positioned and in connection with the remainder of the steering system within the vehicle. When the driver of a vehicle turns the steering mechanism connected to input shaft 1 a set distance, output shaft 5 turns twice the set distance. Conversely, the driver of a vehicle to which steering quickener 20 is installed, may turn the steering mechanism connected to input shaft 1 half the distance the driver would normally have to turn the steering mechanism to turn the vehicle the same distance than if steering quickener was not installed in the vehicle. In racing automobiles, steering response is critical and the steering quickener of the present invention provides a more responsive steering system.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A vehicle, comprising:
   a frame structure;
   at least two wheels rotatably mounted to the frame structure;
   a steering system connected to the frame structure including a steering quickener, wherein the steering quickener comprises;
   a housing connected to a cap, wherein at least the housing or the cap are connected to the vehicle;
   an immobile stationary gear disposed within the housing having a centrally located opening therein;
   an input shaft having a first end in communication with the steering wheel and a second connection end having at least two opposing generally flat surfaces and an opening extending therebetween, wherein at least a portion of the input shaft is disposed within the centrally located opening in the stationary gear and is capable of rotating about a longitudinal axis of the input shaft;
   two or more planetary gears in communication with the stationary gear and the second connection end of the input shaft, wherein each planetary gear includes a centrally located opening therein;
   a drive pin having a first end and a second end, at least a portion of which is disposed within the centrally located opening in the at least two planetary gears and the opening extending between the at least two opposing generally flat surfaces of the second connection end of the input shaft;
   an output gear in communication with at least a portion of the at least two planetary gears;
   a thrust washer having a centrally located opening therein, wherein the thrust washer is in communication with at least a portion of the output gear; and
   an output shaft disposed within at least a portion of the centrally located opening in the output gear so that when the input shaft rotates about its longitudinal axis, the output shaft rotates about its longitudinal axis at about twice the rate of the input shaft.

2. The vehicle of claim 1, wherein an oil-bath lubrication is disposed within the housing connected to the cap.

3. The vehicle of claim 2 further comprising at least one retainer clip clipped to the first and second ends of the drive pin.

4. The vehicle of claim 3 further comprising a roller bearing having a centrally located opening therein, wherein at least a portion of the input shaft is disposed within this opening and the roller bearing is adjacent the stationary gear.

5. The vehicle of claim 4 further comprising a roller bearing having a centrally located opening therein, wherein at least a portion of the output shaft is disposed within this opening and the roller bearing is adjacent the thrust washer.

6. The vehicle of claim 5 further comprising an O-ring having a centrally located opening therein, wherein at least a portion of the input shaft is disposed within this opening and the O-ring is adjacent the roller bearing.

7. The vehicle of claim 6 further comprising an O-ring having a centrally located opening therein, wherein at least a portion of the output shaft is disposed within this opening and the O-ring is adjacent the roller bearing.

8. The vehicle of claim 7, wherein the two or more planetary gears, the input gear and the output gear each comprise gear teeth having a narrower (a) side of a wider (b) side to transfer the torque carrying capacity from the (a) side through the tooth to the (b) side.

9. A steering quickener, comprising:
   a housing connected to a cap;
   an immobile stationary gear disposed within the housing having a centrally located opening therein;
   an input shaft having a first end in communication with the steering wheel and a second connection end having at least two opposing generally flat surfaces and an opening extending therebetween, wherein at least a portion of the input shaft is disposed within the centrally located opening in the stationary gear and is capable of rotating about a longitudinal axis of the input shaft;
   two or more planetary gears in communication with the stationary gear and the second end of the input shaft, wherein each planetary gear includes a centrally located opening therein;
   a drive pin having a first end and a second end, at least a portion of which is disposed within the centrally located opening in the at least two planetary gears and the opening extending between the at least two opposing generally flat surfaces of the second end of the input shaft;
   an output gear in communication with at least a portion of the at least two planetary gears; and
   an output shaft permanently disposed within at least a portion of the centrally located opening in the output gear so that when the input shaft rotates about its longitudinal axis, the output shaft rotates about its longitudinal axis at about twice the rate of the input shaft.

10. The vehicle of claim 9, wherein an oil-bath lubrication is disposed within the housing connected to the cap.

11. The steering quickener of claim 10 further comprising at least one retainer clip clipped to the first and second ends of the drive pin.

12. The steering quickener of claim 11 further comprising a roller bearing having a centrally located opening therein, wherein at least a portion of the input shaft is disposed within this opening and the roller bearing is adjacent the stationary gear.

13. The steering quickener of claim 12 further comprising a roller bearing having a centrally located opening therein, wherein at least a portion of the output shaft is disposed within this opening and the roller bearing is adjacent the thrust washer.

14. The steering quickener of claim 13 further comprising an O-ring having a centrally located opening therein, wherein at least a portion of the input shaft is disposed within this opening and the O-ring is adjacent the roller bearing.

15. The steering quickener of claim 14 further comprising an O-ring having a centrally located opening therein, wherein at least a portion of the output shaft is disposed within this opening and the O-ring is adjacent the roller bearing.

16. The steering quickener of claim 15 further comprising at least one retainer clip clipped to the first and second ends of the drive pin.

\* \* \* \* \*